United States Patent
Saito

(10) Patent No.: US 9,960,437 B2
(45) Date of Patent: May 1, 2018

(54) FUEL CELL SYSTEM AND AIR SYSTEM ABNORMALITY DETERMINATION METHOD

(71) Applicant: TOYOTA JIDOSHA KABUSHIKI KAISHA, Toyota-shi, Aichi-ken (JP)

(72) Inventor: Hiromu Saito, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 326 days.

(21) Appl. No.: 14/938,483

(22) Filed: Nov. 11, 2015

(65) Prior Publication Data

US 2016/0141654 A1    May 19, 2016

(30) Foreign Application Priority Data

Nov. 14, 2014    (JP) .................................. 2014-231883

(51) Int. Cl.
*H01M 8/04* (2016.01)
*H01M 8/04089* (2016.01)
(Continued)

(52) U.S. Cl.
CPC ... *H01M 8/04089* (2013.01); *H01M 8/04395* (2013.01); *H01M 8/04753* (2013.01);
(Continued)

(58) Field of Classification Search
CPC ......... H01M 8/04089; H01M 8/04753; H01M 8/04395; H01M 8/043; H01M 8/04559;
(Continued)

(56) References Cited

U.S. PATENT DOCUMENTS

| 7,442,452 B2 | 10/2008 | Miura |
| 7,517,600 B2 * | 4/2009 | Arthur ............. H01M 8/04126 |
| | | 429/413 |
| 2001/0001287 A1 | 5/2001 | Ueno et al. |

FOREIGN PATENT DOCUMENTS

| JP | 2002-352839 | 12/2002 |
| JP | 2008-060054 | 3/2008 |

(Continued)

*Primary Examiner* — Gary Harris
(74) *Attorney, Agent, or Firm* — Finnegan, Henderson, Farabow, Garrett & Dunner, LLP

(57) ABSTRACT

An object is to allow even a temporary increase in air pressure to be diagnosed as an abnormality. There is provided a fuel cell system including a fuel cell. The fuel cell system comprises an air system that is configured to supply the air to the fuel cell and discharge the air from the fuel cell; a pressure detector that is configured to detect an internal pressure in the air system; a pressure reduction controller that is configured to reduce the internal pressure in the air system to a target pressure reduction value, when the detected pressure becomes higher than a first abnormality detection value during a predetermined time period (S150 and S200 to S220); and a first determiner that is configured to determine that the air system has an abnormality upon determination that number of times when it is determined that the detected pressure becomes higher than the first abnormality detection value is equal to or higher than a predetermined number of times during the predetermined time period (S150, S180, S190 and S160).

8 Claims, 2 Drawing Sheets

(51) Int. Cl.
  *H01M 8/0438*    (2016.01)
  *H01M 8/04746*   (2016.01)
  *H01M 8/04537*   (2016.01)
  *H01M 8/1018*    (2016.01)
  *H01M 8/043*     (2016.01)

(52) U.S. Cl.
  CPC ........ *H01M 8/043* (2016.02); *H01M 8/04559* (2013.01); *H01M 2008/1095* (2013.01); *H01M 2250/20* (2013.01); *Y02T 90/32* (2013.01)

(58) Field of Classification Search
  CPC ...... H01M 2008/1095; H01M 2250/20; Y02T 90/32
  USPC ......................................................... 429/446
  See application file for complete search history.

(56) References Cited

FOREIGN PATENT DOCUMENTS

| | | |
|---|---|---|
| JP | 2009-244184 A | 10/2009 |
| JP | 2010-135214 A | 6/2010 |
| JP | 2012-4138 | 1/2012 |
| JP | 2012-059449 A | 3/2012 |

\* cited by examiner

FUEL CELL SYSTEM AND AIR SYSTEM ABNORMALITY DETERMINATION METHOD

CROSS REFERENCE TO RELATED APPLICATIONS

The present application claims priority from Japanese patent application P2014-231883A filed on Nov. 14, 2014, the entirety of disclosure of which is hereby incorporated by reference into this application.

BACKGROUND

Field

The present invention relates to a fuel cell system and an air system abnormality determination method.

Related Art

As described in JP 2012-4138A, for example, in a conventional fuel cell system, upon determination that a fuel cell is in transient operation, a target pressure value of the air as an oxidizing gas is increased to be higher than a target pressure value during ordinary operation. This suppresses a significant reduction in output voltage of the fuel cell in the case where the air supply system has an abnormality and thus allows the operation of the fuel cell to be continued stably.

SUMMARY

The fuel cell system generally diagnoses that the air system has an abnormality in response to an increase in internal pressure in the air system to an abnormally high level. The fuel cell system described in JP 2012-4138A cannot, however, make such a diagnosis since the target pressure value of the air is increased during transient operation. The diagnosis of the air pressure during transient operation has not been sufficiently examined. There is accordingly a need to provide a technique that enables even a temporary increase in air pressure during transient operation to be diagnoses as an abnormality.

In order to address at least part of the above problems, the invention may be implemented by any of the following aspects.

(1) According to one aspect of the invention, there is provided a fuel cell system including a fuel cell. The fuel cell system may comprise an air system that is configured to supply the air to the fuel cell and discharge the air from the fuel cell; a pressure detector that is configured to detect an internal pressure in the air system; a pressure reduction controller that is configured to reduce the internal pressure in the air system to a target pressure reduction value, when the detected pressure becomes higher than a first abnormality detection value during a predetermined time period; and a first determiner that is configured to determine that the air system has an abnormality upon determination that number of times when it is determined that the detected pressure becomes higher than the first abnormality detection value is equal to or higher than a predetermined number of times during the predetermined time period. In the fuel cell system of this aspect, every time the internal pressure in the air system becomes higher than the first abnormality detection value, the pressure reduction controller reduces the internal pressure in the air system to the target pressure reduction value. This protects the fuel cell from application of a high pressure. Additionally, the air system is determined to have an abnormality upon determination that the number of times when it is determined that the internal pressure in the air system becomes higher than the first abnormality detection value is equal to or higher than the predetermined number of times during the predetermined time period. This enables frequent temporary pressure increases during the transient operation to be reliably diagnosed as an abnormality.

(2) The fuel cell system of the above aspect may return control of the internal pressure in the air system to ordinary control based on an operating condition of the fuel cell, after completion of pressure reduction by the pressure reduction controller. The fuel cell system of this aspect enables the control to be immediately returned from the pressure reduction control by the pressure reduction controller to the ordinary control. This allows the operation of the fuel cell system to be continued stably.

(3) The fuel cell system of the above aspect may further comprise a second determiner that is configured to determine that the air system has an abnormality when the pressure detected by the pressure detector becomes higher than a second abnormality detection value that is higher than the first abnormality detection value. When the pressure is extremely high as being higher than the second abnormality detection value, the fuel cell system of this aspect immediately determines that the air system is abnormal.

(4) In the fuel cell system of the above aspect, the predetermined time period may be a time period in which the fuel cell is in power generation operation. The fuel cell system of this aspect determines that the air system has an abnormality by counting the number of times when the internal pressure in the air system becomes higher than the first abnormality detection value during power generation operation of the fuel cell. This enhances the accuracy of the determination.

(5) The fuel cell system of the above aspect may stop power generation of the fuel cell when it is determined that the air system has an abnormality. The fuel cell system of this aspect stops power generation of the fuel cell upon determination that the air system is abnormal. This enhances the reliability of the fuel cell system.

(6) According to another aspect of the invention, there is provided an air system abnormality determination method in a fuel cell system comprising a fuel cell, an air system that is configured to supply the air to the fuel cell and discharge the air from the fuel cell, and a pressure detector that is configured to detect an internal pressure in the air system. The air system abnormality determination method may comprise: reducing the internal pressure in the air system to a target pressure reduction value, when the detected pressure becomes higher than a first abnormality detection value during a predetermined time period; and determining that the air system has an abnormality upon determination that number of times when it is determined that the detected pressure becomes higher than the first abnormality detection value is equal to or higher than a predetermined number of times during the predetermined time period. Like the fuel cell system of the above aspect, the air system abnormality determination method of this aspect protects the fuel cell from application of a high pressure. Additionally, this enables frequent temporary pressure increases during the transient operation to be reliably diagnosed as an abnormality.

The invention may be implemented by any of various aspects other than the fuel cell system and the air system abnormality determination method described above, for example, a vehicle with a fuel cell system mounted thereon, a computer program that implements functions corresponding to the respective steps of the air system abnormality determination method, and a non-transitory storage medium in which the computer program is stored.

The following describes an embodiment of the invention.

DESCRIPTION OF THE EMBODIMENTS

A. Hardware Configuration

Figure 1:
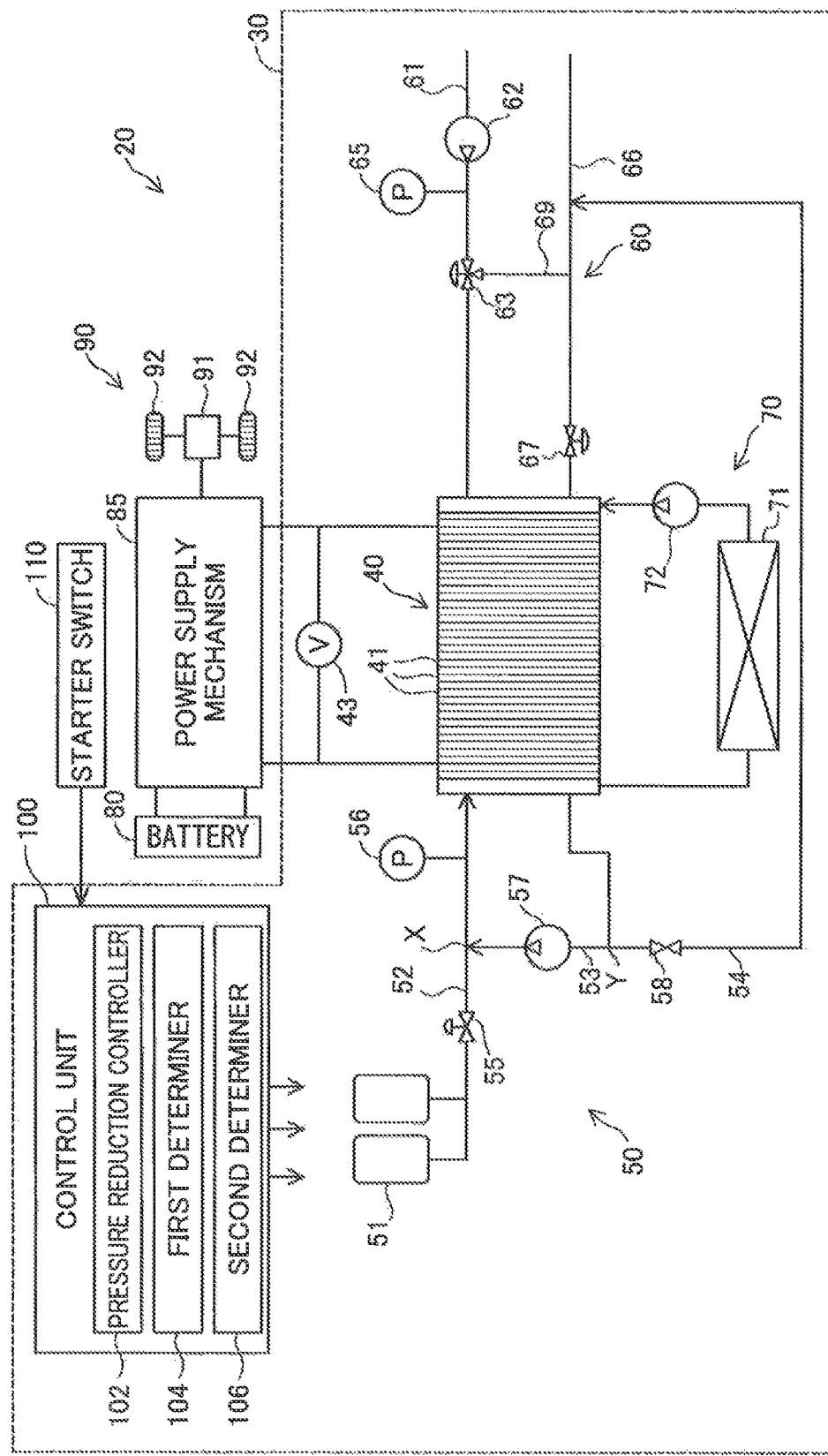
FIG. 1 is a diagram illustrating the schematic configuration of a fuel cell vehicle according to one embodiment of the invention.

FIG. 1 is a diagram illustrating the schematic configuration of a fuel cell vehicle 20 according to one embodiment of the invention. The fuel cell vehicle 20 is a four-wheel vehicle and includes a fuel cell system 30, a battery 80, a power supply mechanism 85 and a drive mechanism 90.

The fuel cell system 30 includes a fuel cell stack 40, a hydrogen gas supply discharge mechanism 50, an air supply discharge mechanism 60, a cooling water circulation mechanism 70 and a control unit 100.

The fuel cell stack 40 is a unit that generates electricity through electrochemical reaction of hydrogen and oxygen and is configured by stacking a plurality of unit cells 41. The unit cell 41 is mainly comprised of an anode, a cathode, an electrolyte and separators. The fuel cell stack 40 may be any of various types of fuel cells but is a polymer electrolyte fuel cell according to this embodiment.

The hydrogen gas supply discharge mechanism 50 is configured to supply and discharge hydrogen gas to and from the fuel cell stack 40. The hydrogen gas herein means a hydrogen-rich gas and is not limited to pure hydrogen. The hydrogen gas supply discharge mechanism 50 includes a hydrogen tank 51, a hydrogen gas supply path 52, a hydrogen gas circulation path 53, and a hydrogen gas discharge path 54.

The hydrogen tank 51 is configured to store high-pressure hydrogen gas. The hydrogen gas supply path 52 is a conduit arranged to supply the hydrogen gas stored in the hydrogen tank 51 to the fuel cell stack 40. The hydrogen gas circulation path 53 is a conduit arranged to circulate the hydrogen gas that is not consumed but is discharged from the fuel cell stack 40 to the hydrogen gas supply path 52. The hydrogen gas discharge path 54 is a conduit arranged to connect the hydrogen gas circulation path 53 with an air discharge path 66 (described later) provided in the air supply discharge mechanism 60.

An injector 55 serving as a hydrogen gas supply valve is provided on the hydrogen gas supply path 52 upstream of a connecting point X of the hydrogen gas circulation path 53 and the hydrogen gas supply path 52. The injector 55 changes at least one of a valve opening area (valve-opening position) and a valve release time to supply a required flow rate of hydrogen gas to the downstream, so as to adjust the gas flow rate (or molar concentration of hydrogen) supplied to the downstream.

The hydrogen gas supply discharge mechanism 50 also includes a pressure sensor 56. The pressure sensor 56 is provided to detect the pressure of hydrogen gas in the hydrogen gas supply path 52 downstream of the connecting point X.

A hydrogen circulation pump 57 is provided on the hydrogen gas supply path 53 downstream of a connecting point Y of the hydrogen gas discharge path 54 and the hydrogen gas circulation path 53. The hydrogen circulation pump 57 serves to circulate the hydrogen gas in the hydrogen gas circulation path 53. A purge valve 58 is provided in the middle of the hydrogen gas discharge path 54. The purge valve 58 is opened in the case of an increase in amount of impurities in the hydrogen gas circulation path 53 to discharge the impurities from the air discharge path 66.

The air supply discharge mechanism 60 is configured to supply and discharge the air as oxidizing gas to and from the fuel cell stack 40, and includes an air supply path 61, an air discharge path 66 and a bypass path 69. The air supply path 61 and the air discharge path 66 are provided as flow paths that respectively connect the fuel cell stack 40 with an air opening of the air supply path 61 and with an air opening of the air discharge path 66. An air cleaner (not shown) is provided at the air opening of the air supply path 61. The bypass path 69 is provided as a flow path that connects the air supply path 61 with the air discharge path 66.

The air supply discharge mechanism 60 also includes an air compressor 62. The air compressor 62 is provided in the middle of the air supply path 61 to take in the air through the air opening of the air supply path 61 and compress the intake air. The location where the air compressor 62 is placed is the position closer to the air opening than a connecting point of the air supply path 61 and the bypass path 69.

The air supply discharge mechanism 60 further includes a flow-dividing shutoff valve 63. The flow-dividing shutoff valve 63 is provided at the connecting point of the air supply path 61 and the bypass path 69 to divide the flow of the compressed air from the air compressor 62 into a downstream side of the air supply path 61 and the bypass path 69. This valve is called three-way valve. The "flow-dividing" herein includes not only distributing the flow rate into two branches but distributing the entire (100%) flow rate to either one of the two branches. When the flow-dividing shutoff valve 63 has a valve opening of 100%, 100% of the flow of the compressed air from the air compressor 62 is supplied to the fuel cell stack 40.

The air supply discharge mechanism 60 additionally includes a pressure sensor 65 serving as a pressure detector. The pressure sensor 65 detects the air pressure in the air supply path 61 between the air compressor 62 and the flow-dividing shutoff valve 63.

The air supply discharge mechanism 60 also includes a pressure-regulating shutoff valve 67. The pressure-regulating shutoff valve 67 is provided on the air discharge path 66 to regulate the flow section area of the air discharge path 66 according to the valve-opening position.

The air passing through the pressure-regulating shutoff valve 67 flows through the connecting point of the bypass path 69 and the air discharge path 66, and is released through the air opening to the atmosphere.

The air supply discharge mechanism 60 corresponds to the subordinate concept of the "air system".

The cooling water circulation mechanism 70 is configured to cool down the fuel cell stack 40, and includes a radiator 71 and a cooling water circulation pump 72. The cooling water circulation mechanism 70 is configured to circulate cooling water between the unit cells 41 and the radiator 71 and thereby control the operation temperature of the unit cells 41. Such circulation of the cooling water achieves absorption of heat at the unit cells 41 and release of heat at the radiator 71.

The power supply mechanism 85 is connected with the fuel cell stack 40 to supply electric power generated by the fuel cell stack 40 to electrically powered devices. Examples of the electrically powered devices include a motor 91 for driving drive wheels 92 and a compressor for air conditioning (not shown). The power supply mechanism 85 is configured to transmit electric power to and from the battery 80, in addition to the fuel cell system 30. The battery 80 is a chargeable and dischargeable secondary battery and may be, for example, a nickel hydride battery.

The operation of the fuel cell system 30 is controlled by the control unit 100. The control unit 100 is implemented by a microcomputer including a CPU, a RAM and a ROM. The control unit 100 controls, for example, the operations of the injector 55, the operations of the respective valves 58, 63 and 67 and the operations of the pump 57 and the air compressor 62 in the fuel cell system 30. In order to perform such controls, the control unit 100 inputs various signals. The signals include, for example, output signals from the pressure sensors 56 and 65, a voltage sensor 43 that is configured to detect a power generation voltage of the fuel cell stack 40, and a starter switch 110 that is configured to start the fuel cell stack 40. The starter switch 110 is provided in an operation unit in a vehicle interior and is operated by the driver.

The control unit 100 performs "ordinary control" that controls a target pressure value of the air pressure-fed by the air compressor 62, based on the operating condition of the fuel cell stack 40, as pressure control in the air system. The ordinary control includes a control that increases the target pressure value to be higher than the target pressure value in ordinary operation (constant speed operation or deceleration operation) when the fuel cell stack 40 is in transient operation, i.e., the fuel cell vehicle 20 is in acceleration.

The control unit 100 includes a pressure reduction controller 102 and a first determiner 104 as functional components. The pressure reduction controller 102 is configured to reduce the internal pressure of the air supply discharge mechanism 60 to a target pressure reduction value when the air pressure detected by the pressure sensor 65 becomes higher than a tentative abnormality detection threshold in a predetermined time period when the fuel cell system 30 is in power generation operation (hereinafter this time period is referred to as "power generation operation period"). The first determiner 104 is configured to determine that the air supply discharge mechanism 60 has an abnormality upon determination that the number of times when it is determined that the air pressure detected by the pressure sensor 65 becomes higher than the tentative abnormality detection threshold is equal to or higher than a predetermined number of times during the power generation operation period. The following describes the configurations of the respective functional components 102 and 104 in detail.

B. Control in Air System

Figure 2:
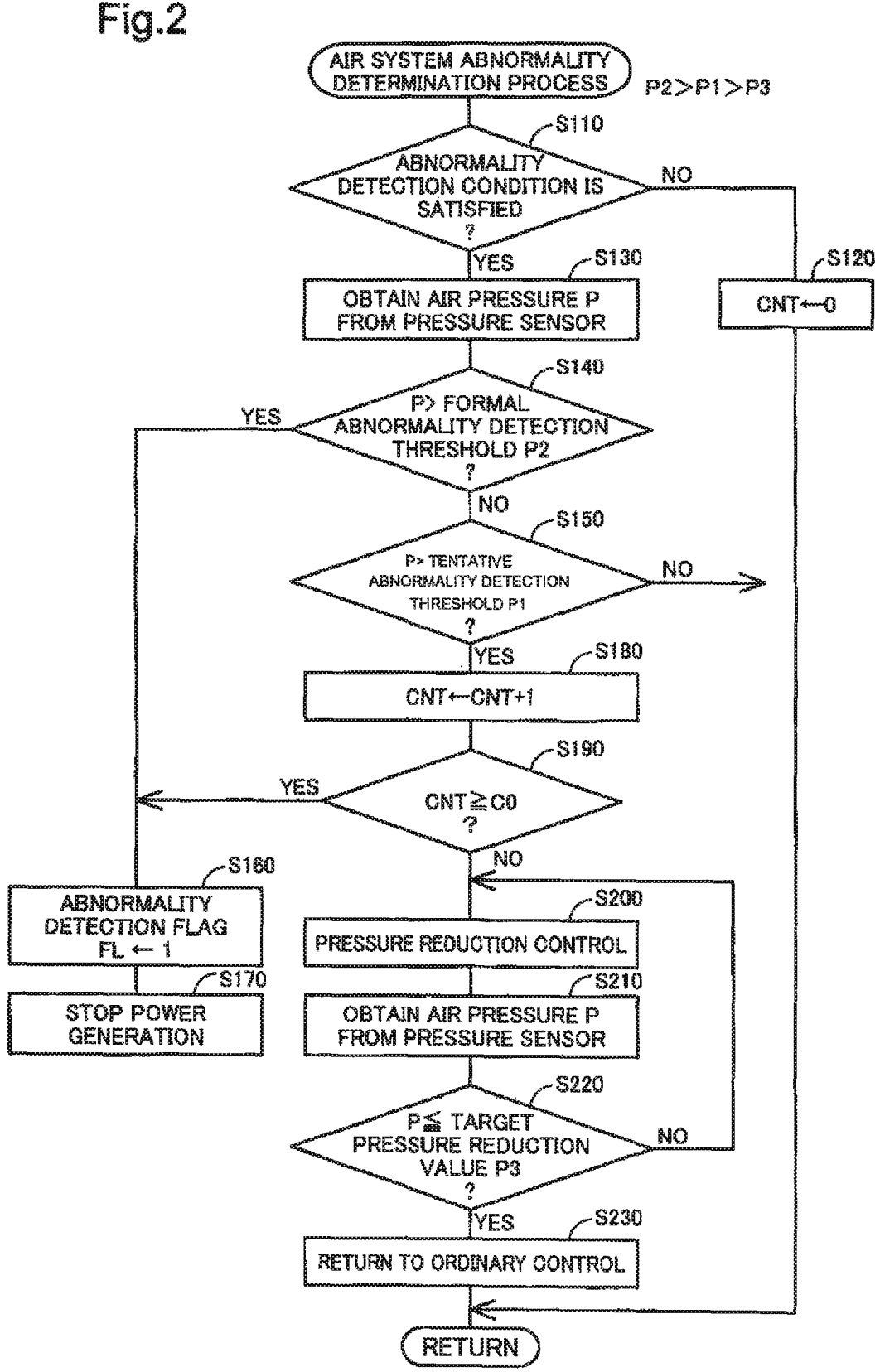
FIG. 2 is a flowchart showing an air system abnormality determination process.

FIG. 2 is a flowchart showing an air system abnormality determination process. The air system abnormality determination process is triggered in response to detection of an on-operation of the starter switch 110 by the control unit 100. On start of the processing flow, the control unit 100 first determines whether an abnormality detection condition is satisfied (step S110). According to this embodiment, the abnormality detection condition is that "the fuel cell stack 40 is in power generation operation". It is determined whether the fuel cell stack 40 is in power generation operation by comparison between an open circuit voltage (OCV) of the fuel cell stack 40 detected by the voltage sensor 43 and a reference value.

The abnormality detection condition at step S110 may include two conditions that "the fuel cell stack 40 is in power generation operation" and "battery voltage (+B) from the battery 80 is equal to or higher than a predetermined value", instead of only one condition that "the fuel cell stack 40 is in power generation operation". When the battery voltage (+B) is lower than the predetermined value, the target value of the air pressure may be forcibly increased to increase the output of the fuel cell stack 40. In this case, the condition that "battery voltage (+B) from the battery 80 is equal to or higher than a predetermined value" may be excluded from the abnormality detection condition.

When it is determined at step S110 that the abnormality detection condition is not satisfied, i.e., when it is determined that the fuel cell stack 40 is not in power generation operation, the control unit 100 clears a counter value CNT for abnormality detection to value 0 (step S120). The counter value CNT is provided in the RAM of the control unit 100. After the processing of step S120, the control unit 100 terminates this air system abnormality determination process.

When it is determined at step S110 that the abnormality detection condition is satisfied, i.e., when it is determined that the fuel cell stack 40 is in power generation operation, on the other hand, the control unit 100 proceeds to step S130 to obtain an air pressure P detected by the pressure sensor 65. The control unit 100 subsequently determines whether the air pressure P is higher than a predetermined formal abnormality detection threshold P2 (step S140). When it is determined at step S140 that the air pressure P is equal to or lower than the formal abnormality detection threshold P2, the control unit 100 subsequently determines whether the air pressure P is higher than a tentative abnormality detection threshold P1 that is lower than the formal abnormality detection threshold P2 (step S150). The formal abnormality detection threshold P2 is a slightly lower value than a pressure resistance value of the fuel cell stack 40 and may be, for example, 290 [kPa]. The tentative abnormality detection threshold P1 may be, for example, 270 [kPa]. These numerical values are only illustrative and are not restrictive at all. According to this embodiment, the tentative abnormality detection threshold P1 is set to a higher value than the target pressure value in transient operation during ordinary control.

When it is determined at step S140 that the air pressure P is higher than the formal abnormality detection threshold P2, the control unit 100 sets an abnormality detection flag FL to value 1 (step S160). The abnormality detection flag FL is a flag used to indicate that the air supply discharge mechanism 60 as the air system has an abnormality and is provided in the RAM of the control unit 100. The "air system" herein or more specifically the air supply discharge mechanism 60 includes the valves 63 and 67 and the air compressor 62, as well as the flow paths 61, 66 and 69. The fact that the abnormality detection flag FL is the value 1 means that at least part of the air system is abnormal. The abnormality detection flag FL has been cleared to value 0 in advance. Once the abnormality detection flag FL is set to the value 1, the abnormality detection flag FL is kept at the value 1 until being cleared at an auto-repair garage or the like.

After the processing of step S160, the control unit 100 stops power generation of the fuel cell stack 40 (step S170). The power generation of the fuel cell stack 40 is stopped by (i) closing the injector 55 provided in the fuel gas system and setting the rotation speed of the air compressor 62 to 0 [rpm] to stop the supply of hydrogen gas and the air, and (ii) turning off the hydrogen circulation pump 57 to stop the circulation of hydrogen gas in the circulation system. Simultaneously with a stop of power generation, an audio or display alarm may be provided to draw the driver's attention.

When it is determined at step S150 that the air pressure P is equal to or lower than the tentative abnormality detection threshold P1, the control unit 100 goes to return and terminates this air system abnormality determination process.

When it is determined at step S150 that the air pressure P is higher than the tentative abnormality detection threshold P1, on the other hand, the control unit 100 performs an increment process to increment the counter value CNT by 1 (step S180). This increment process counts the number of times when it is determined that the air pressure P becomes higher than the tentative abnormality detection threshold P1 since a switch of the fuel cell stack 40 from the non-power generation operation to the power generation operation, as the counter value CNT. The control unit 100 subsequently determines whether the counter value CNT is equal to or higher than a predetermined abnormality settlement frequency C0 (step S190). The abnormality settlement frequency C0 is a positive integral number greater than 1 and is set to 5 according to this embodiment. The abnormality settlement frequency C0 is, however, not limited to 5 but may be another value such as 10 or 20.

When it is determined at step S190 that the counter value CNT is equal to or higher than the abnormality settlement frequency C0, i.e., in the case where the number of times when it is determined that the air pressure P becomes higher than the tentative abnormality detection threshold P1 since a switch to the power generation operation is equal to or higher than the abnormality settlement frequency C0, the control process 100 proceeds to step S160 to set the abnormality detection flag FL to the value 1 and subsequently goes to step S170 to stop power generation of the fuel cell stack 40.

When it is determined at step S190 that the counter value CNT is lower than the abnormality settlement frequency C0, on the other hand, the control unit 100 performs pressure reduction control to reduce the pressure in the air system (step S200). The pressure reduction control reduces the pressure in the air system by (i) setting the rotation speed of the air compressor 62 to 0 [rpm], (ii) setting the valve-opening position of the flow-dividing shutoff valve 63 to 0% (to introduce the entire flow to the bypass path 69) and (iii) opening the pressure-regulating shutoff valve 67. The control unit 100 subsequently obtains the air pressure P detected by the pressure sensor 65 (step S210) and determines whether the air pressure P becomes equal to or lower than a predetermined target pressure reduction value P3 (step S220). When it is determined that the air pressure P does not become equal to or lower than the target pressure reduction value P3, the control unit 100 returns to step S200 to continue the pressure reduction control.

When it is determined at step S220 that the air pressure P is equal to or lower than the target pressure reduction value P3, the control unit 100 returns the pressure control in the air system to the ordinary control (step S230) and then terminates this air system abnormality determination process.

The processing of steps S150, S200, S210 and S220 in the air system abnormality determination process of FIG. 2 corresponds to the functions of the pressure reduction controller 102 (shown in FIG. 1). The processing of steps S150, S180, S190 and S160 in the air system abnormality determination process of FIG. 2 corresponds to the functions of the first determiner 104 (shown in FIG. 1). The processing of steps S140 and S160 in the air system abnormality determination process of FIG. 2 corresponds to the functions of a second determiner 106 (shown in FIG. 1).

C. Advantageous Effects of Embodiment

In the fuel cell system 30 having the above configuration, the pressure reduction controller 102 recues the pressure to the target pressure reduction value P3 every time the internal pressure P in the air system becomes higher than the tentative abnormality detection threshold P1 during the power generation operation period. This protects the fuel cell stack 40 from application of a high pressure. Additionally, the air system is determined to have an abnormality upon determination that the number of times when it is determined that the internal pressure P in the air system becomes higher than the tentative abnormality detection threshold P1 is equal to or higher than the number of times defined by the abnormality settlement frequency C0 during the power generation operation period. This enables frequent temporary pressure increases during the transient operation to be reliably diagnosed as an abnormality. The pressure control in the air system is returned to the ordinary control immediately after the pressure reduction control. This allows the operation of the fuel cell system 30 to be continued stably.

When the pressure P is extremely high as being higher than the formal abnormality detection threshold P2, the fuel cell system 30 immediately detects an abnormality. Additionally, upon determination that the air system is abnormal, the fuel cell system 30 stops power generation of the fuel cell stack 40. This enhances the reliability of the fuel cell system 30.

D. Modifications

Modification 1

In the embodiment described above, the air supply discharge mechanism 60 serving as the air system is configured to include the flow-dividing shutoff valve 63 and the bypass path 69. A modified configuration may exclude the flow-dividing shutoff valve 63 and the bypass path 69. The air system may have any configuration that enables the air to be supplied to and discharged from the fuel cell.

Modification 2

In the embodiment described above, the pressure sensor 65 serving as the pressure detector is located between the air compressor 62 and the flow-dividing shut-off valve 63 in the air supply path 61. In a modified configuration, for example, the pressure sensor 65 may be located downstream of the flow-dividing shutoff valve 63 in the air supply path 61 or may be located upstream of the pressure-regulating shutoff valve 67 in the air discharge path 66. The pressure detector may be located at any position that enables the internal pressure in the air system to be detected.

Modification 3

In the embodiment described above, the predetermined time period is specified as the time period when the fuel cell is in power generation operation. The counter value CNT is incremented when the pressure P becomes higher than the tentative abnormality detection threshold P1 during the predetermined time period. The counter value CNT is cleared out of the predetermined time period. In a modified configuration, the predetermined time period may be a time period specified by the date and the time, for example, the number of days. For example, the counter value CNT may be cleared at every five days.

Modification 4

In the embodiment described above, power generation of the fuel cell stack 40 is immediately stopped when the abnormality detection flag FL is set to the value 1. In a modified configuration, power generation of the fuel cell stack 40 may be stopped later or may not be stopped.

Modification 5

In the embodiment described above, the abnormality detection flag is set to the value 1 upon determination that the number of times (counter value CNT in the embodiment) when it is determined that the air pressure becomes higher than the first abnormality detection value (tentative abnormality detection threshold P1 in the embodiment) is equal to or higher than the predetermined number of times (abnormality settlement frequency C0 in the embodiment) during the predetermined time period (power generation operation period in the embodiment). A modified configuration may determine whether the number of times when it is determined that the air pressure during the predetermined time period becomes higher than the first abnormality detection value is equal to or higher than the predetermined number of times at the end of the predetermined time period and may set the abnormality detection flag to the value 1 upon determination that number of times is equal to or higher than the predetermined number of times.

In the embodiment described above, the control of the internal pressure in the air system is returned to the ordinary control based on the operating condition of the fuel cell stack 40 (step S230) after completion of the pressure reduction by the processing of steps S200 to S220. A modified configuration may perform any desired control other than the ordinary control after reduction of the internal pressure in the air system.

In the embodiment described above, the air system is determined to have an abnormality when the detected pressure becomes higher than the formal abnormality detection threshold P2 that is higher than the tentative abnormality detection threshold P1 (steps S140 and A160). A modified configuration may exclude the processing of step S140 and may determine that the air system is abnormal (step S160) after the processing of steps S150, S180 and S190.

In the embodiment described above, the number of times when it is determined that the air pressure P becomes higher than the tentative abnormality detection threshold P1 is integrated during the time period when the fuel cell is in power generation operation and is used for the determination (steps S180 and S190). The time period in which the number of times when it is determined that the pressure becomes higher than the first abnormality detection value is integrated may be any adequate time period other than the time period when the fuel cell is in power generation operation, for example, a time period between satisfaction of the abnormality detection condition (step S110: YES) and return of the control to the ordinary control (step S230).

In the embodiment described above, the power generation of the fuel cell stack 40 is stopped (steps S160 and S170), upon determination that the air system is abnormal. For example, a modified configuration may not stop power generation of the fuel cell upon determination that the air system is abnormal but may provide display alarm to urge the user to stop the fuel cell system.

Modification 6

In the embodiment described above, the fuel cell system is mounted on the vehicle such as the motor vehicle but may be incorporated in a house, a store, a plant or the like.

Part of the functions implemented by the software configuration in the above embodiment may be configured by hardware (for example, integrated circuit), and part of the functions implemented by the hardware configuration may be configured by software.

The invention is not limited to any of the embodiment and its modifications described above but may be implemented by a diversity of configurations without departing from the scope of the invention. For example, the technical features of any of the embodiment and its modifications corresponding to the technical features of the respective aspects described in SUMMARY may be replaced or combined appropriately, in order to solve part or all of the problems described above or in order to achieve part or all of the advantageous effects described above. Components other than those described in independent claims among components of any of the embodiment and its modifications are additional components and may be omitted appropriately.

What is claimed is:

1. A fuel cell system including a fuel cell, the fuel cell system comprising
   an air system that is configured to supply the air to the fuel cell and discharge the air from the fuel cell;
   a pressure detector that is configured to detect an internal pressure in the air system;
   a pressure reduction controller that is configured to reduce an internal pressure in the air system to a target pressure reduction value, when the detected pressure becomes higher than a first abnormality detection value during a predetermined time period;
   a first determiner that is configured to count a number of times that the detected pressure becomes higher than the first abnormality detection value and determine that the air system has an abnormality when the number of times acquired by the count becomes equal to or higher than a predetermined number of times during the predetermined time period; and
   a second determiner that is configured to determine that the air system has an abnormality when the pressure detected becomes higher than a second abnormality detection value that is higher than the first abnormality detection value.

2. The fuel cell system according to claim 1,
   after completion of pressure reduction by the pressure reduction controller, the fuel cell system returning control of the internal pressure in the air system to ordinary control based on an operating condition of the fuel cell.

3. The fuel cell system according to claim 1,
   wherein the predetermined time period is a time period in which the fuel cell is in power generation operation.

4. The fuel cell system according to claim 1,
   the fuel cell system stopping power generation of the fuel cell when it is determined that the air system has an abnormality.

5. In a fuel cell system comprising a fuel cell, an air system that is configured to supply the air to the fuel cell and discharge the air from the fuel cell, and a pressure detector that is configured to detect an internal pressure in the air system, an air system abnormality determination method, comprising:

reducing the internal pressure in the air system to a target pressure reduction value, when the detected pressure becomes higher than a first abnormality detection value during a predetermined time period;

counting a number of times that the detected pressure becomes higher than the first abnormality detection value and determining that the air system has an abnormality when the number of times acquired by the count becomes equal to or higher than a predetermined number of times during the predetermined time period; and determining that the air system has an abnormality when the pressure detected becomes higher than a second abnormality detection value that is higher than the first abnormality detection value.

6. The air system abnormality determination method according to claim 5, further comprising after completion of pressure reduction, returning control of the internal pressure in the air system to ordinary control based on an operating condition of the fuel cell.

7. The air system abnormality determination method according to claim 5, wherein the predetermined time period is a time period in which the fuel cell is in power generation operation.

8. The air system abnormality determination method according to claim 5, further comprising stopping power generation of the fuel cell when it is determined that the air system has an abnormality.

\* \* \* \* \*